US012307391B2

(12) United States Patent
Nonaka et al.

(10) Patent No.: US 12,307,391 B2
(45) Date of Patent: May 20, 2025

(54) INFORMATION PROCESSING APPARATUS AND INFORMATION PROCESSING SYSTEM

(71) Applicant: TOYOTA JIDOSHA KABUSHIKI KAISHA, Toyota (JP)

(72) Inventors: Ryogo Nonaka, Kawasaki (JP); Hirona Ota, Seto (JP); Yuki Tatsumoto, Seto (JP); Tsunehiro Yokomori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/217,911

(22) Filed: Jul. 3, 2023

(65) Prior Publication Data
US 2024/0013102 A1    Jan. 11, 2024

(30) Foreign Application Priority Data
Jul. 8, 2022    (JP) .................................. 2022-110670

(51) Int. Cl.
*G06Q 10/02*    (2012.01)
*G06Q 50/40*    (2024.01)

(52) U.S. Cl.
CPC ............. *G06Q 10/02* (2013.01); *G06Q 50/40* (2024.01)

(58) Field of Classification Search
CPC ................................. G06Q 10/02; G06Q 50/40
See application file for complete search history.

(56) References Cited

U.S. PATENT DOCUMENTS

| | | | |
|---|---|---|---|
| 2014/0207538 A1* | 7/2014 | Jin | G06Q 20/045 705/13 |
| 2015/0248689 A1* | 9/2015 | Paul | G06Q 30/0222 705/14.23 |
| 2018/0039918 A1* | 2/2018 | Koga | G08G 1/202 |
| 2018/0197418 A1* | 7/2018 | Chu | G06Q 10/04 |
| 2021/0248518 A1* | 8/2021 | Lee | G06F 3/04895 |
| 2021/0264328 A1 | 8/2021 | Tatsumoto et al. | |
| 2022/0292411 A1* | 9/2022 | Choi | G06Q 20/40145 |
| 2023/0161534 A1* | 5/2023 | Gilbert | G06Q 30/0241 345/173 |
| 2023/0162247 A1* | 5/2023 | Galon | H04W 4/026 705/7.35 |
| 2023/0271590 A1* | 8/2023 | Moltmann | B60R 25/241 701/24 |
| 2024/0220077 A1* | 7/2024 | Ding | G06F 3/0485 |

FOREIGN PATENT DOCUMENTS

| | | |
|---|---|---|
| JP | 2011-227550 A | 11/2011 |
| JP | 2020-161137 A | 10/2020 |
| JP | 2021-135692 A | 9/2021 |

OTHER PUBLICATIONS

Marie-Pier Pelletier, Smart card data use in public transit: A literature review, 2011, p. 557-560 (Year: 2011).*

* cited by examiner

*Primary Examiner* — Ibrahim N El-Bathy
(74) *Attorney, Agent, or Firm* — Oliff PLC

(57) ABSTRACT

An information processing apparatus comprises a controller configured to acquire first data for identifying a first user who is a user of an on-demand bus that is operated on demand, the first data being read by a signage apparatus installed at a boarding/alighting point of the on-demand bus, and make a boarding reservation for the on-demand bus based on the first data.

13 Claims, 20 Drawing Sheets

VEHICLE 10 (VEHICLE-MOUNTED APPARATUS 100)    SIGNAGE 300    SIGNAGE 300    SIGNAGE 300

SERVER APPARATUS 200

| VEHICLE ID | DATE/TIME INFORMATION | ROUTE INFORMATION | POSITION INFORMATION | VEHICLE INFORMATION |
|---|---|---|---|---|
| V00001 | X | ... | BETWEEN X001-X002 | ... |

FIG. 3

| APPARATUS ID OF TRANSMISSION DESTINATION SIGNAGE | DATE/TIME INFORMATION | FIRST VEHICLE | | | SECOND VEHICLE | | | |
|---|---|---|---|---|---|---|---|---|
| | | ROUTE INFORMATION | ARRIVAL TIME | VEHICLE INFORMATION | ROUTE INFORMATION | ARRIVAL TIME | VEHICLE INFORMATION | |
| S00001 | ... | ... | ... | ... | ... | ... | ... | ... |

FIG. 6

SIGNAGE DATA

| APPARATUS ID | BUS STOP ID | ADDRESS | ... |
|---|---|---|---|
| S00001 | X11 | ... | ... |

FIG. 8A

ROUTE DATA

| ROUTE ID | BUS STOP ID | VIA POINT | TERMINAL POINT ID |
|---|---|---|---|
| R00001 | X01 | X02, X03··· | X11 |

FIG. 8B

| USER ID | USER INFORMATION | IC CARD INFORMATION | | SETTLEMENT INFORMATION | |
|---|---|---|---|---|---|
| | | PERSONAL IDENTIFIER | SERVICE IDENTIFIER | | |
| U001 | ⋮ | ⋮ | ⋮ | ⋮ | ⋮ |
| ⋮ | ⋮ | ⋮ | ⋮ | ⋮ | ⋮ |

FIG. 9

| USER ID | RESERVATION DATE/TIME | BOARDING DATE/TIM | BOARDING POINT | ALIGHTING POINT | STATUS |
|---|---|---|---|---|---|
| U001 | ... | ... | ... | ... | RESERVATION COMPLETE |
| U002 | ... | ... | ... | ... | BOARDING COMPLETE |
| U003 | ... | ... | ... | ... | SETTLEMENT COMPLETE |
| ... | ... | ... | ... | ... | ... |

FIG. 10

BUS ARRIVAL INFORMATION

1ST
LINE 001 TO XXXXX
  ARRIVING IN 1 MIN
LOW-FLOOR BUS

2ND
LINE 011 TO YYYYY
  ARRIVING IN 6 MINS
LOW-FLOOR BUS

PLEASE TOUCH CARD TO READER TO MAKE BOARDING RESERVATION.

FOLLOWING CARDS CAN BE USED.
- INDIVIDUAL NUMBER CARD
- HEALTH INSURANCE CARD
- DRIVER'S LICENSE

FIG. 12

BOARDING REQUEST

PLEASE SPECIFY
BOARDING VEHICLE

1ST
LINE 001 TO XXXXX
  ARRIVING IN 3 MINS
  LOW-FLOOR BUS

2ND
LINE 011 TO YYYYY
  ARRIVING IN 6 MINS
  LOW-FLOOR BUS

RETURN

FIG. 13A

INFORMATION PROCESSING APPARATUS AND INFORMATION PROCESSING SYSTEM

CROSS REFERENCE TO THE RELATED APPLICATION

This application claims the benefit of Japanese Patent Application No. 2022-110670, filed on Jul. 8, 2022, which is hereby incorporated by reference herein in its entirety.

BACKGROUND

Technical Field

The present disclosure relates to an on-demand bus.

Description of the Related Art

On-demand buses that are operated according to requests from users are known. An on-demand bus allows a user to get on or off the bus at a specified point based on a request.

In this regard, Japanese Patent Laid-Open No. 2021-135692 discloses a system that is used to make an online boarding reservation for an on-demand bus, for example.

SUMMARY

The present disclosure is aimed at increasing convenience of a user of an on-demand bus.

The present disclosure in its one aspect provides an information processing apparatus comprising a controller configured to acquire first data for identifying a first user who is a user of an on-demand bus that is operated on demand, the first data being read by a signage apparatus installed at a boarding/alighting point of the on-demand bus, and make a boarding reservation for the on-demand bus based on the first data.

The present disclosure in its another aspect provides an information processing system comprising at least one signage apparatus that is installed at a boarding/alighting point of an on-demand bus that is operated on demand; and an information processing apparatus, wherein the signage apparatus includes a first controller configured to read first data for identifying a first user who is a user of the on-demand bus and transmit the first data to the information processing apparatus, and the information processing apparatus includes a second controller configured to make a boarding reservation for the on-demand bus based on the first data.

As another mode, there may be cited a program for causing a computer to perform a method that is performed by the apparatus described above, or a non-transitory computer-readable storage medium storing the program.

According to the present disclosure, convenience of a user of an on-demand bus may be increased.

BRIEF DESCRIPTION OF THE DRAWINGS

FIG. 3 is an example of vehicle data that is transmitted from the vehicle-mounted apparatus 100;

FIG. 6 is an example of guide data that is delivered to the signage 300;

FIG. 8A is an example of signage data that is stored in a storage 202;

FIG. 8B is an example of route data that is stored in the storage 202;

FIG. 9 is an example of user data that is stored in the storage 202;

FIG. 10 is an example of boarding data that is stored in the storage 202;

FIG. 12 is an example of a screen that is output to the signage 300;

FIG. 13A is an example of the screen that is output to the signage 300;

DESCRIPTION OF THE EMBODIMENTS

Figure 1:
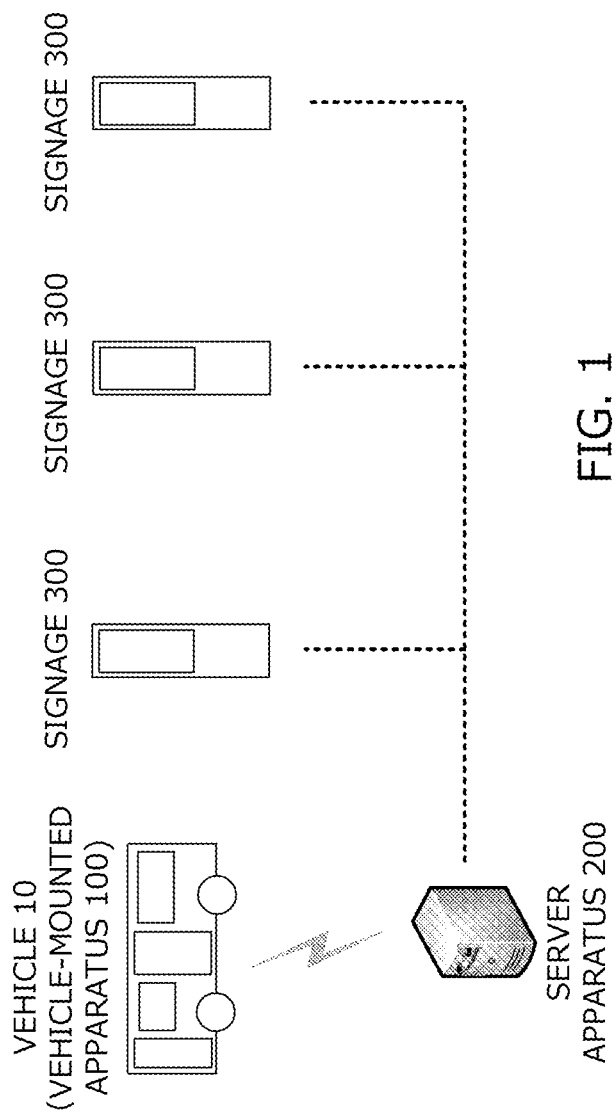
FIG. 1 is a schematic diagram of a transport system according to a first embodiment.

An on-demand bus that is operated based on a request from a user is known. An on-demand bus is a shared vehicle, an operation route, a timetable or the like of which is determined based on a request from a user.

A boarding reservation for an on-demand bus may be made via the Internet, for example. However, some users, especially elderly people, have difficulty making reservations online.

Accordingly, a method of installing a digital signage at a stop where the on-demand bus is to stop, and allowing a boarding reservation to be made using the digital signage as an interface is conceivable.

However, such a method also has a problem. That is, there is a problem that a digital signage does not have means for identifying an individual. To reliably receive payment of a fee, and to receive only necessary reservation, it is desirable that an individual can be identified.

An information processing apparatus according to the present disclosure solves such problems.

An information processing apparatus according to a mode of the present disclosure includes a controller configured to acquire first data for identifying a first user who is a user of the on-demand bus, the first data being read by a signage apparatus installed at a boarding/alighting point of a bus that is operated on demand, and make a boarding reservation for the bus based on the first data.

The information processing apparatus according to the mode is typically a server apparatus that manages operation of the on-demand bus.

The on-demand bus is a shared vehicle that is operated according to a request from a user. In the present embodiment, the on-demand bus picks up a user according to a boarding request from the user.

There is known a system that provides operation information and the like of a route bus using a signage apparatus that is installed at a stop. The signage apparatus is an information terminal that is installed at a stop of a bus. By using the signage apparatus, information about a bus including a destination, a via point, an arrival time and the like may be provided in real time.

The information processing apparatus receives, from the signage apparatus, the first data for identifying the user (the first user) of the on-demand bus. The first data may be data that is obtained by the signage apparatus reading an IC card, a tag or the like for identifying the user, for example. Identification of the user may be performed by using an IC card, an NFC tag, an RFID tag or the like that is capable of short-range wireless communication, for example.

Such an IC card or tag does not have to be issued for a transport service of the on-demand bus. For example, the IC card may be a card that is issued in relation to another service (a second service), such as a health insurance card, a driver's license, an individual number card, or other IC cards. An IC card or the like that enables individual identification in relation to another service may enable individual identification in relation to the transport service by the on-demand bus.

For example, in the case where the IC card or the like mentioned above is capable of providing an identifier of a second service and a unique user ID or the like associated with the second service, the user of the on-demand bus may be uniquely identified by such a combination.

Accordingly, the information processing apparatus may store data (user data) for mapping the first data (that is, data for identifying an individual in relation to the second service) to user information related to the transport service by the on-demand bus.

Additionally, the information processing apparatus may further receive, from the signage apparatus, data (second data) specifying a boarding vehicle, a boarding section, and the like. For example, the boarding vehicle, the boarding section and the like may be specified by the first user by using a touch panel or the like provided on the signage apparatus. Who is to travel which section may thus be grasped.

Furthermore, the information processing apparatus may store a history on a boarding reservation made by the user, and may infer the boarding section of the first user based on a past boarding reservation. An inference result may be transmitted to the signage apparatus. A suggestion regarding the boarding section may thus be made by the signage.

Furthermore, the information processing apparatus may store data for mapping the first data to settlement-related information. The settlement-related information may be information about a payment method (for example, a credit card, electronic money or the like), or may be information about a past settlement result or credit information (payment record or the like). According to such a configuration, whether to accept a new boarding reservation or not may be determined based on past payment record or the like.

In the following, a specific embodiment of the present disclosure will be described with reference to the drawings. A hardware configuration, a module configuration, a functional configuration and the like described in the embodiment are not intended to limit the technical scope of the disclosure unless stated otherwise.

First Embodiment

An outline of a vehicle system according to a first embodiment will be given with reference to FIG. 1. The vehicle system according to the present embodiment includes a vehicle 10 where a vehicle-mounted apparatus 100 is mounted, a server apparatus 200, and a plurality of digital signages (hereinafter, "signage" or "signages") 300. The number of vehicles 10 (the vehicle-mounted apparatuses 100) and the number of signages 300 included in the system may be more than one.

The vehicle 10 is a route bus on which the vehicle-mounted apparatus 100 is mounted and that is operated on demand. The vehicle-mounted apparatus 100 is capable of performing wireless communication with the server apparatus 200, and the vehicle 10 travels based on an instruction that is received from the server apparatus 200. The vehicle 10 may be a vehicle that is driven by a driver, or may be an autonomous vehicle.

In the following, the vehicle 10 is also referred to as an on-demand bus or a bus.

The signage 300 is an apparatus that is installed at a stop of the on-demand bus, and that displays an image using a display, a projector or the like. By using the signage 300, an arrival time or operation information of a bus may be provided to a user waiting for arrival of the bus. Additionally, the signage 300 may also include a function of outputting audio, or a function of acquiring input.

In the present embodiment, the signage 300 may generate a boarding request for the on-demand bus by interacting with the user. The generated boarding request is transmitted to the server apparatus 200, and a boarding reservation is made by the server apparatus 200.

The server apparatus 200 is an apparatus that makes a boarding reservation for the on-demand bus based on the boarding request that is transmitted from the signage 300. The server apparatus 200 includes a reservation database recording a reservation book, and updates the reservation book based on the boarding request, and also, transmits information about the user to the vehicle-mounted apparatus 100 mounted on the vehicle 10.

Furthermore, the server apparatus 200 also serves to receive data about operation of the bus from the vehicle 10 (the vehicle-mounted apparatus 100), and to deliver data for informing about operation of the bus to the signage 300 based on the data. The server apparatus 200 receives data from a plurality of vehicles 10 (the vehicle-mounted apparatuses 100) that are being managed, and stores the data in a database. Furthermore, data to be provided to each of a plurality of signages 300 is generated based on data that is stored, and is delivered to each signage at a predetermined timing. The signage 300 provides information based on the data that is received. A situation related to a bus being operated may thereby be provided to a user waiting at a stop.

Each element forming the system will be described.

The vehicle 10 is a vehicle that travels as the on-demand bus, and is a connected car that includes a function of communicating with an external network. The vehicle-mounted apparatus 100 is mounted on the vehicle 10.

The vehicle-mounted apparatus 100 is a computer that is mounted on the vehicle 10. The vehicle-mounted apparatus 100 transmits various information pieces including position information to the server apparatus 200 via a wireless network. Furthermore, the vehicle-mounted apparatus 100 receives instructions regarding operation (an operation route, an operation schedule, presence/absence of a boarding reservation, and the like) from the server apparatus 200, and provides the same to the driver or a crew member (or an apparatus controlling autonomous driving).

The vehicle-mounted apparatus 100 may also serve as an apparatus that provides information to the driver or a crew member of the bus or to a passenger. For example, the vehicle-mounted apparatus 100 may be an appliance (hereinafter "operation-related appliance") that provides guide about operation to a passenger. For example, as the operation-related appliance, an appliance that controls a destination display unit or an announcement device of the vehicle 10 may be cited.

The vehicle-mounted apparatus 100 may be a computer including processors such as a CPU and a GPU, main memories such as a RAM and a ROM, and an auxiliary memory such as an EPROM, a hard disk drive, a removable medium or the like. The auxiliary memory stores an operating system (OS), various programs, various tables and the like, and each function matching a predetermined object as described below may be implemented by executing a program stored therein. Note that one or some or all of the functions may instead be implemented by a hardware circuit such as an ASIC or an FPGA.

Figure 2:
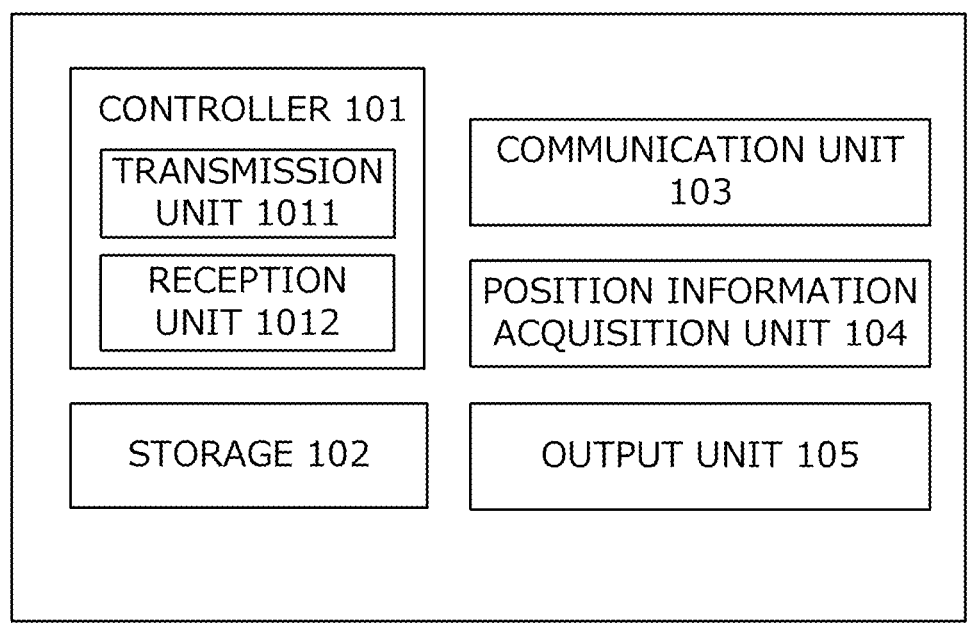
FIG. 2 is a diagram illustrating structural elements of a vehicle-mounted apparatus 100.

FIG. 2 is a diagram illustrating structural elements of the vehicle-mounted apparatus 100 in detail.

The vehicle-mounted apparatus 100 includes a controller 101, a storage 102, a communication unit 103, a position information acquisition unit 104, and an output unit 105.

The controller 101 is an operation unit that implements various functions of the vehicle-mounted apparatus 100 by executing predetermined programs. For example, the controller 101 may be implemented by the CPU or the like.

As functional modules, the controller 101 includes a transmission unit 1011 and a reception unit 1012. Each functional module may be implemented by executing a program that is stored, by the CPU.

The transmission unit 1011 acquires or generates data about operation of the vehicle 10, and transmits the same to the server apparatus 200 at a predetermined timing. The data about operation of the vehicle 10 (hereinafter "vehicle data") is an operation route, a destination, a current traveling position (stops between which traveling is being performed), and the like, for example. These information pieces may be acquired from the operation-related appliance (for example, the appliance that controls guide announcement, the destination display unit or the like) that is mounted on the vehicle. The transmission unit 1011 periodically generates the vehicle data and transmits the same to the server apparatus 200.

FIG. 3 is an example of the vehicle data.

The vehicle data includes fields of vehicle ID, date/time information, route information, position information, and vehicle information. The field "vehicle ID" stores an identifier for uniquely identifying the vehicle 10. The field "date/time information" stores date/time of generation of the vehicle data.

The field "route information" stores information about the operation route of the vehicle 10.

The field "position information" stores a section where the vehicle 10 is currently traveling. For example, the position information may be indicated by latitude and longitude, or may be indicated by an ID of a stop. For example, the position information may be information such as "traveling from stop X1 to X2".

The position information may be acquired via the position information acquisition unit 104 described later. The position information may also be acquired from the operation-related appliance described above. For example, the section being traveled may be determined based on data that is acquired from the operation-related appliance.

The vehicle data may include other information pieces (vehicle information) about the vehicle 10. Such information may be the type of the vehicle 10 (such as a low-floor bus), or information about facilities of the vehicle 10 (such as a wheelchair space and a wheelchair ramp), for example.

The storage 102 is means for storing information, and is a storage medium such as a RAM, a magnetic disk, a flash memory or the like. The storage 102 stores various programs to be executed by the controller 101, data to be used by the programs, and the like.

The communication unit 103 includes an antenna and a communication module for performing wireless communication. The antenna is an antenna element for performing input/output of wireless signals. In the present embodiment, the antenna is compatible with mobile communication (for example, mobile communication such as 3G, LTE, or 5G). Note that the antenna may include a plurality of physical antennas. For example, in the case of performing mobile communication using radio waves in a high-frequency band, such as microwaves or millimeter waves, a plurality of antennas may be disposed in a distributed manner to stabilize communication. The communication module is a module for performing mobile communication.

The position information acquisition unit 104 includes a GPS antenna and a positioning module for measuring the position information. The GPS antenna is an antenna that receives a positioning signal that is transmitted from a positioning satellite (also referred to as a GNSS satellite). The positioning module is a module that calculates the position information based on a signal that is received by the GPS antenna.

The output unit 105 is a unit that outputs information, and may be a display device, an audio output device or the like, for example. In the case where the operation-related appliance is mounted on the vehicle 10, the output unit 105 may perform output of images, sound or the like in conjunction with the appliance.

Next, the server apparatus 200 will be described.

Firstly, the server apparatus 200 performs processes of generating data for providing guide to a user based on the vehicle data collected from a plurality of vehicles 10 (the vehicle-mounted apparatuses 100), and transmitting the data to the signage 300.

Secondly, the server apparatus 200 performs processes of receiving data requesting boarding on the on-demand bus from the signage 300, and making a boarding reservation for a target bus (the vehicle 10).

Figure 4:
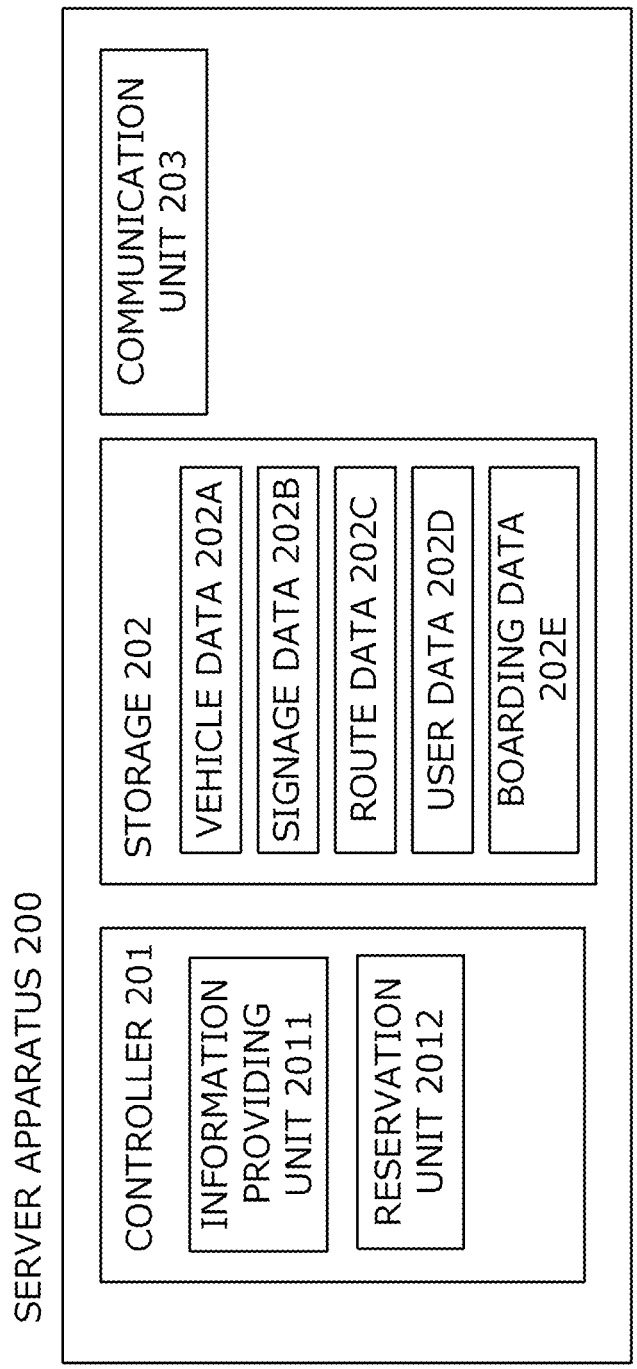
FIG. 4 is a diagram illustrating structural elements of a server apparatus 200.

FIG. 4 is a diagram illustrating in detail structural elements of the server apparatus 200 included in the vehicle system according to the present embodiment.

The server apparatus 200 may be a computer including processors such as a CPU and a GPU, main memories such as a RAM and a ROM, and an auxiliary memory such as an EPROM, a hard disk drive, a removable medium or the like. The auxiliary memory stores an operating system (OS), various programs, various tables and the like, and each function matching a predetermined object as described below may be implemented by loading a program stored therein into a work area of the main memory and executing the same such that each structural unit is controlled through execution of the program. However, one or some or all of the functions may instead be implemented by a hardware circuit such as an ASIC or an FPGA.

The server apparatus 200 includes a controller 201, a storage 202, and a communication unit 203.

The controller 201 is an operation device in charge of control that is performed by the server apparatus 200. The controller 201 may be implemented by an operation processing device such as the CPU.

As functional modules, the controller 201 includes an information providing unit 2011 and a reservation unit 2012. Each functional module may be implemented by executing a program that is stored, by the CPU.

The information providing unit 2011 collects the vehicle data from a plurality of vehicles 10 (the vehicle-mounted apparatuses 100), and outputs guide to a plurality of signages 300 that are installed at a plurality of stops, based on the collected data.

The information providing unit 2011 controls the plurality of signages 300 based on the collected vehicle data and data about stops and signages that is stored in advance. The information providing unit 2011 determines a vehicle that is approaching each stop, based on the pieces of data, and transmits data (hereinafter "guide data") to the signage 300 installed at each stop so that information about the corresponding vehicle is output.

Figure 5:
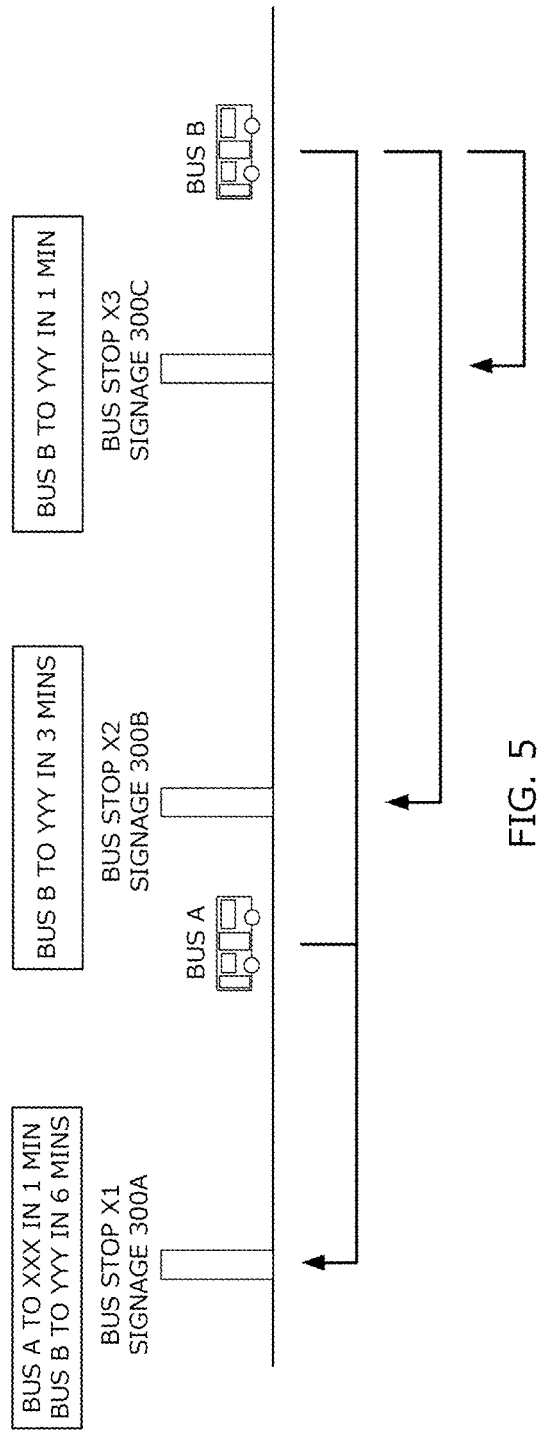
FIG. 5 is a diagram describing information that is output to a signage 300.

FIG. 5 is an example describing information that the signage 300 installed at each stop outputs. Here, the signages installed at a stop X1, a stop X2, and a stop X3 are distinguished from each other by being denoted by reference signs 300A, 300B, and 300C, respectively.

In the illustrated example, a bus A and a bus B are approaching the stop X1. Furthermore, the bus B is approaching the stops X2 and X3. A stop where a bus that is traveling travels to or through may be determined by referring to data about a route (described later) that is stored in advance.

In the case where there is a rule that "the signage 300 is to display information about a bus departed a stop that is three stops before", the information providing unit 2011 determines that the signage 300A installed at the stop X1 is to output information about the buses A and B. Furthermore, the information providing unit 2011 determines that the signages 300B and 300C installed at the stops X2 and X3 are to output information about the bus B.

Then, the information providing unit 2011 generates data to be transmitted to each signage 300. That is, the information providing unit 2011 performs the following processes:
(1) generate the guide data to be transmitted to the signage 300A, based on the vehicle data transmitted from the bus A and the bus B,
(2) generate the guide data to be transmitted to the signage 300B, based on the vehicle data transmitted from the bus B, and
(3) generate the guide data to be transmitted to the signage 300C, based on the vehicle data transmitted from the bus B.

The guide data includes information that is to be output by respective signage 300. In the present embodiment, the guide data is data for causing the signage 300 to generate image data. In the present embodiment, the signage 300 generates the image data based on the guide data, and outputs the image data.

FIG. 6 is an example of the guide data that is transmitted from the server apparatus 200 to the signage 300. The guide data includes an identifier of the signage 300 that is a data transmission destination, and date/time information. Furthermore, the guide data includes a set of route information, a predicted time until arrival, and vehicle information. Such data is defined for each vehicle. For example, in the illustrated example, data of two vehicles, that is, a vehicle that is arriving next and a vehicle that is arriving after the vehicle that is arriving next, is included.

Next, the reservation unit 2012 will be described.

The reservation unit 2012 makes a boarding reservation for the vehicle 10 based on the boarding request transmitted from the signage 300.

Figure 7:
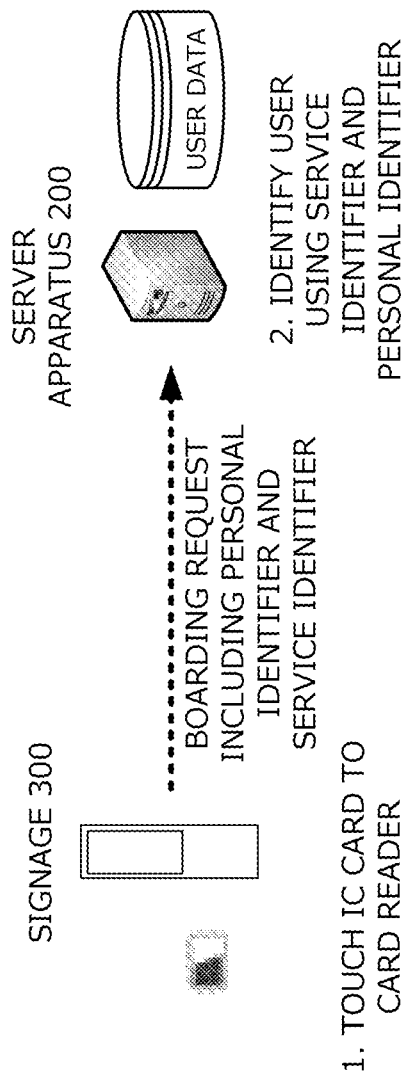
FIG. 7 is a schematic diagram of a boarding reservation that is performed using the signage 300.

A method of making a boarding reservation using the signage 300 will be described with reference to FIG. 7. With the vehicle system according to the present embodiment, a user who is to get onboard the vehicle 10 performs personal authentication using an IC card. The IC card does not have to be a card that is provided for the transport service by the on-demand bus as long as data for identifying the individual can be provided. As such an IC card, a driver's license, a health insurance card, an individual number card or the like may be cited, for example. The IC card is desirably capable of providing an identifier corresponding to an owner (a personal identifier) and an identifier of a service (a service identifier). For example, in the case where the IC card is a driver's license, the service identifier is "driver's license", and the personal identifier is "driving license number". There are various IC cards, but the combination is unique. Accordingly, even if the IC card is not provided for the transport service by the on-demand bus, the server apparatus 200 is able to identify the person who is to get onboard the on-demand bus.

In the present embodiment, the signage 300 performs short-range wireless communication with the IC card that a user carries, and acquires the personal identifier and the service identifier (hereinafter, the combination will be referred to as "IC card information"). Furthermore, the signage 300 transmits a boarding request including the personal identifier and the service identifier to the server apparatus 200. The boarding request may include information specifying a boarding vehicle, a boarding section, and the like.

The server apparatus 200 stores data (user data) for mapping the combination of the personal identifier and the service identifier to the user, and identifies the user based on the user data and makes a boarding reservation. The boarding reservation may be made by referring to reservation book data managing a plurality of vehicles 10.

The storage 202 includes a main memory and an auxiliary memory. The main memory is a memory where a program to be executed by the controller 201, and data to be used by the control program are developed. The auxiliary memory is a device that stores the program to be executed by the controller 201, and the data to be used by the control program.

The storage 202 stores vehicle data 202A, signage data 202B, route data 202C, user data 202D, and boarding data 202E.

The vehicle data 202A is a collection of a plurality of pieces of vehicle data transmitted from the vehicle-mounted apparatuses 100. A plurality of pieces of vehicle data described with reference to FIG. 3 are stored in the vehicle data 202A. Note that the vehicle data 202A that is stored may be deleted at a predetermined timing (such as a timing of lapse of a predetermined time from reception).

The signage data 202B is data about the signages 300 that are installed at a plurality of stops. The route data 202C is data about a route along which a route bus that is being managed by the apparatus travels.

FIG. 8A illustrates an example of the signage data 202B.

The signage data 202B includes the identifier of the signage 300, an identifier of the stop where the signage is installed, a network address of the signage, and the like. The server apparatus 200 may identify a transmission destination of the guide data by referring to the signage data 202B.

FIG. 8B illustrates an example of the route data 202C.

The route data 202C includes an identifier of a route, an identifier of a stop that is a starting point, an identifier of a stop that is a via point, an identifier of a stop that is a terminal point, and the like. The server apparatus 200 may identify a stop that a bus travels to or through, by referring to the route data 202C. In the case where the operation route of a bus is dynamically determined, the route data 202C may be updated every time operation of a bus is determined.

The user data 202D is data about a user of the transport service by the on-demand bus. The user data stores user information that is registered in advance. Furthermore, the user data is data that associates the user information and the IC card information with each other.

FIG. 9 is an example of the user data 202D.

The user data 202D includes fields of user ID, user information, IC card information, and settlement information.

The field "user ID" stores an identifier for uniquely identifying a user of the transport service. The field "user information" stores personal information or the like of the user.

The field "IC card information" stores information about the IC card that is used at the time of the user getting on the vehicle 10. The IC card information includes the personal identifier and the service identifier described above.

The field "settlement information" stores information for settling a fee of the on-demand bus. As the settlement information, credit card information, electronic money information and the like may be cited, for example.

The boarding data 202E is data about boarding of a user. FIG. 10 is an example of the boarding data 202E. The boarding data includes fields of user ID, reservation date/time, boarding date/time, boarding point, alighting point, and status. The boarding data 202E is generated by the reservation unit 2012 at a timing when a boarding reservation is made by a user. Furthermore, the boarding data is updated as appropriate according to a use state of the bus by each user. For example, when a boarding reservation is made, the status is "reserved", but when the user gets on the bus, update to a value such as "onboard" or "settlement complete" is performed.

The communication unit 203 is a communication interface for connecting the server apparatus 200 to a network. For example, the communication unit 203 includes a network interface board, or a wireless communication interface for wireless communication.

Next, the signage 300 will be described.

The signage 300 is an apparatus that gives guide to a user waiting at a stop, based on the guide data that is transmitted from the server apparatus 200. The signage 300 also functions as an interface that is used by a user to make a boarding reservation for the vehicle 10.

Figure 11:
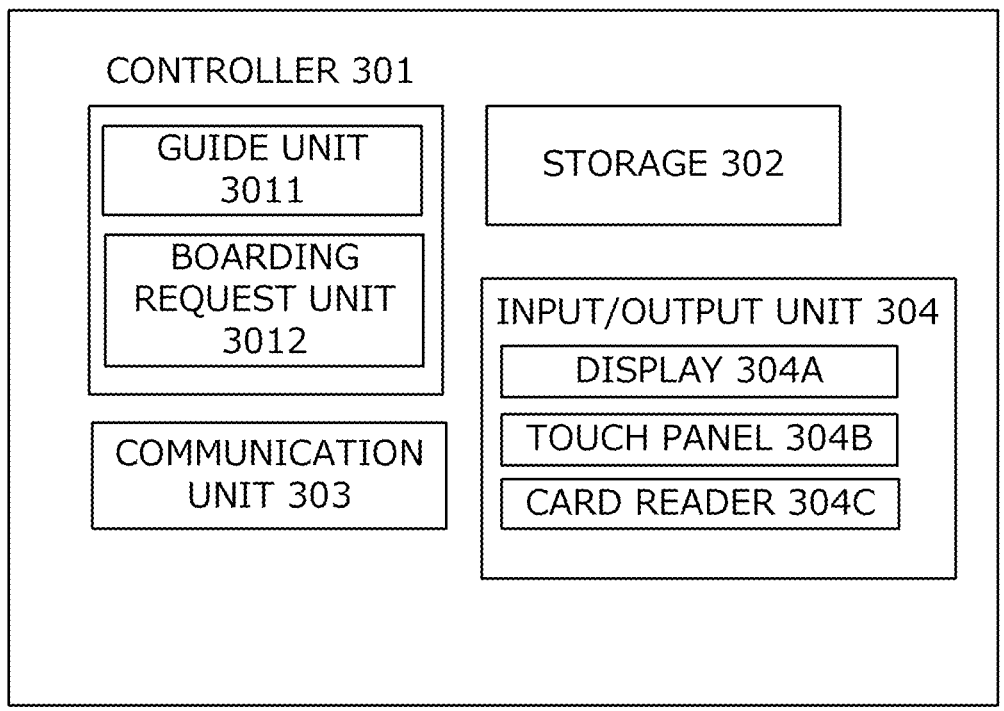
FIG. 11 is a diagram illustrating structural elements of the signage 300.

FIG. 11 is a diagram illustrating, in detail, structural elements of the signage 300 included in the vehicle system according to the present embodiment.

The signage 300 may be a computer including processors such as a CPU and a GPU, main memories such as a RAM and a ROM, and an auxiliary memory such as an EPROM, a hard disk drive, a removable medium or the like. Note that one or some or all of the functions may instead be implemented by a hardware circuit such as an ASIC or an FPGA.

The signage 300 includes a controller 301, a storage 302, a communication unit 303, and an input/output unit 304.

The controller 301 is an operation device in charge of control that is performed by the signage 300. The controller 301 may be implemented by an operation processing device such as the CPU.

As functional modules, the controller 301 includes a guide unit 3011 and a boarding request unit 3012. Each functional module may be implemented by executing a program that is stored, by the CPU.

The guide unit 3011 outputs an image based on the guide data received from the server apparatus 200. In the present embodiment, the guide unit 3011 generates image data based on the guide data, and outputs the image data to the input/output unit 304. Accordingly, the guide unit 3011 may perform a process of generating the image data according to a predetermined rule.

FIG. 12 is an example of an image that is generated by the guide unit 3011 based on the guide data illustrated in FIG. 6. The guide unit 3011 generates the image as illustrated, based on the guide data, and outputs the same via the input/output unit 304. In the case where the guide data includes data about a plurality of buses, the guide unit 3011 generates an image including information pieces about the plurality of buses. Furthermore, in the case where an arrival time is indicated by a remaining time, the guide unit 3011 may measure time, and update time display.

When a user selects a vehicle using the input/output unit 304 (for example, by tapping inside a frame), the boarding request unit 3012 generates a request (a boarding request) for getting on the selected vehicle. The boarding request unit 3012 performs interaction with the user and collects information that is necessary for generating the boarding request, by performing the following processes.

More specifically, first, information (the personal identifier and the service identifier) is acquired from the IC card carried by the user via a card reader 304C described later.

Figure 13B:
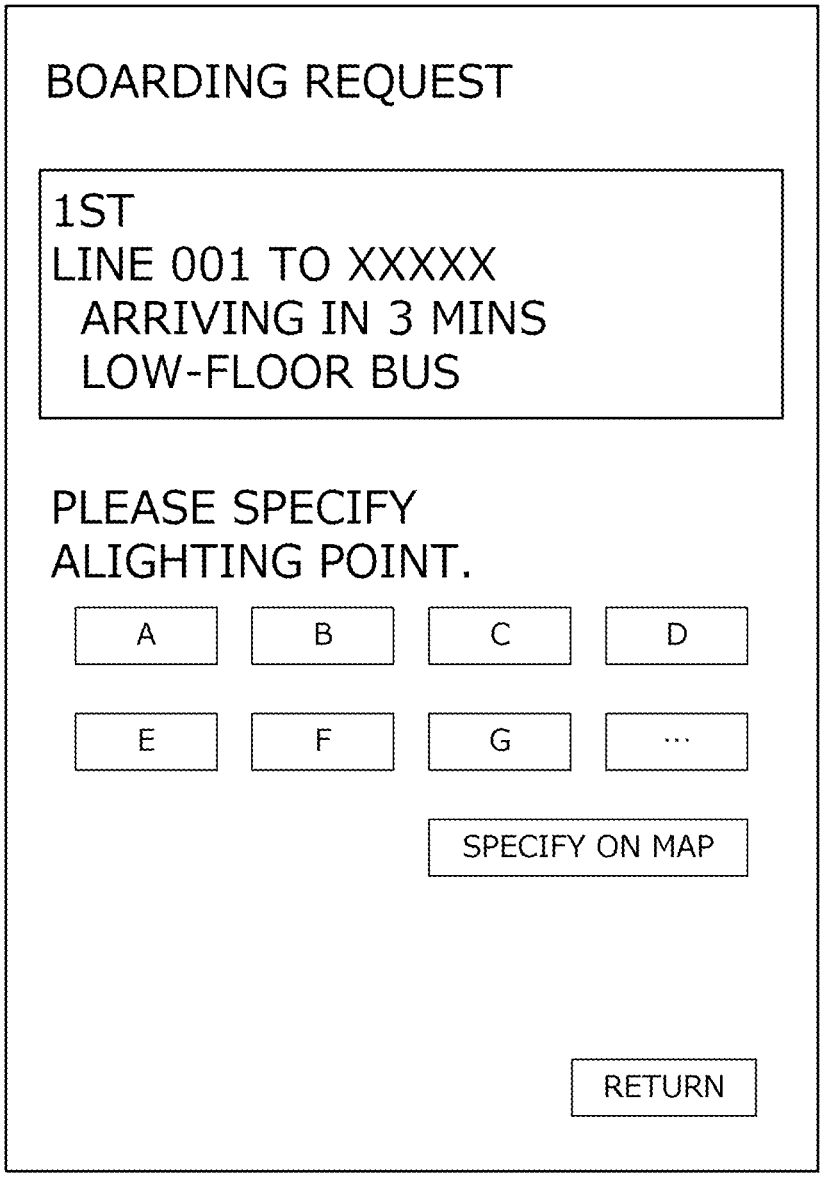
FIG. 13B is an example of the screen that is output to the signage 300.

Next, the boarding vehicle and the boarding section are acquired via a touch panel 304B described later. FIGS. 13A and 13B are each an example of a screen for specifying the boarding vehicle and the boarding section.

Then, a boarding request including the IC card information, the boarding vehicle, and the boarding section is generated and transmitted to the server apparatus 200.

The storage 302 includes a main memory and an auxiliary memory. The main memory is a memory where a program to be executed by the controller 301, and data to be used by the control program are developed. The auxiliary memory is a device that stores the program to be executed by the controller 301, and the data to be used by the control program.

The communication unit 303 is a communication interface for connecting the signage 300 to a network. For example, the communication unit 303 includes a network interface board, or a wireless communication interface for wireless communication.

The input/output unit 304 is a device that is used for inputting/outputting information. More specifically, the input/output unit 304 includes a display 304A, the touch panel 304B, and the card reader 304C. In the present embodiment, the touch panel and the display are one touch panel display. The input/output unit 304 may include a unit that outputs audio (such as an amplifier and a speaker).

The input/output unit 304 may output an image by the display 304A, and may receive input by the touch panel 304B.

The card reader 304C is an interface for performing short-range wireless communication with an IC card. The card reader 304C is capable of communicating with the IC card using a standard such as NFC, for example.

The configurations illustrated in FIGS. 2, 4 and 11 are merely examples, and one or some or all of the illustrated functions may be executed using a dedicated circuit. Furthermore, a program may be stored and executed by a combination of a main memory and an auxiliary memory other than those illustrated.

Next, a process that is performed by each apparatus will be described.

Figure 14:
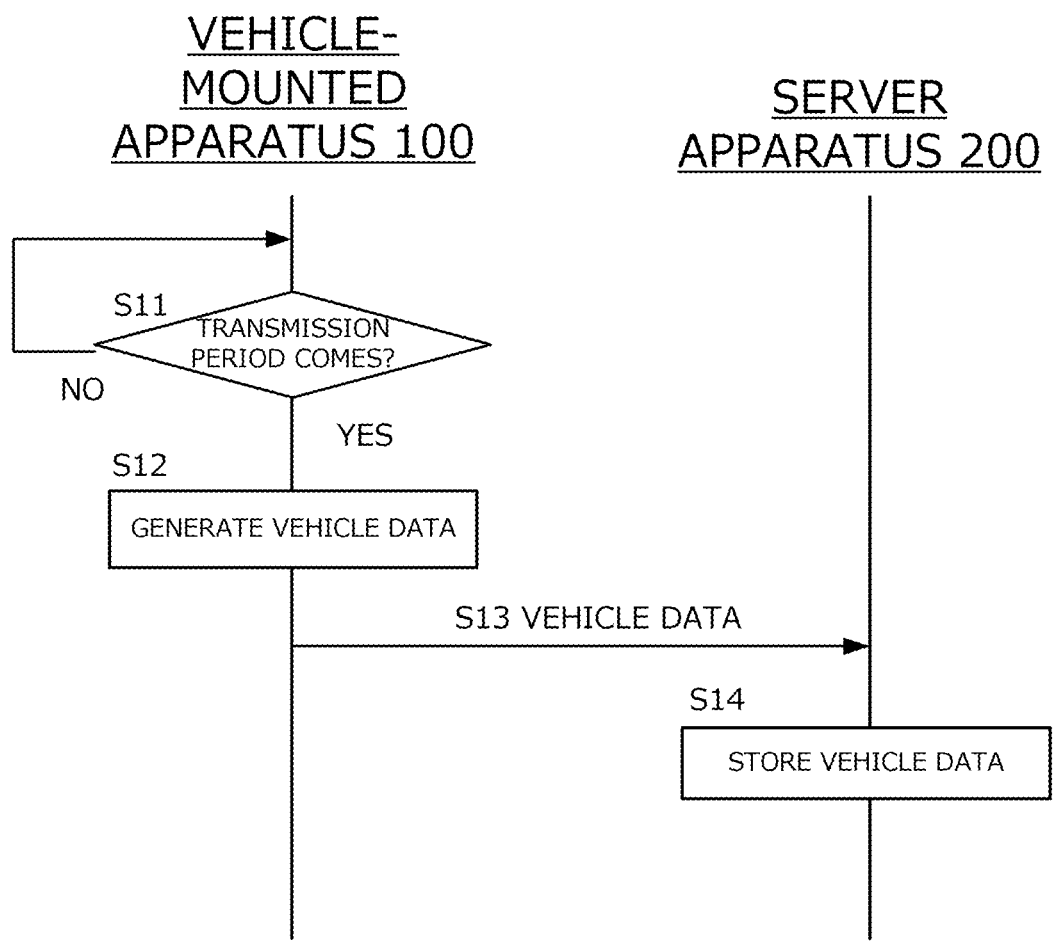
FIG. 14 is a sequence diagram of a process of transmission of the vehicle data by the vehicle-mounted apparatus 100.

FIG. 14 is a sequence diagram of a process of transmission/reception of the vehicle data by the vehicle-mounted apparatus 100 and the server apparatus 200. The illustrated process is repeated every predetermined period of time during traveling of the vehicle 10.

First, in step S11, the transmission unit 1011 determines whether a predetermined transmission period comes or not. In the case where a predetermined period (a period of one minute, for example) comes, the process proceeds to step S12. In the case where the predetermined period does not come, standby is performed for a predetermined time, and the process is repeated.

In step S12, the transmission unit 1011 generates the vehicle data. As described above, the vehicle data may be acquired via the operation-related appliance mounted on the vehicle 10 or the position information acquisition unit 104.

The vehicle data that is generated is transmitted to the server apparatus 200 in step S13.

In step S14, the server apparatus 200 (the information providing unit 2011) receives the vehicle data that is transmitted from the vehicle-mounted apparatus 100, and stores the same in the storage 202.

Pieces of vehicle data that are received from a plurality of vehicles 10 are thus accumulated as appropriate in the storage 202 of the server apparatus 200.

Figure 15:
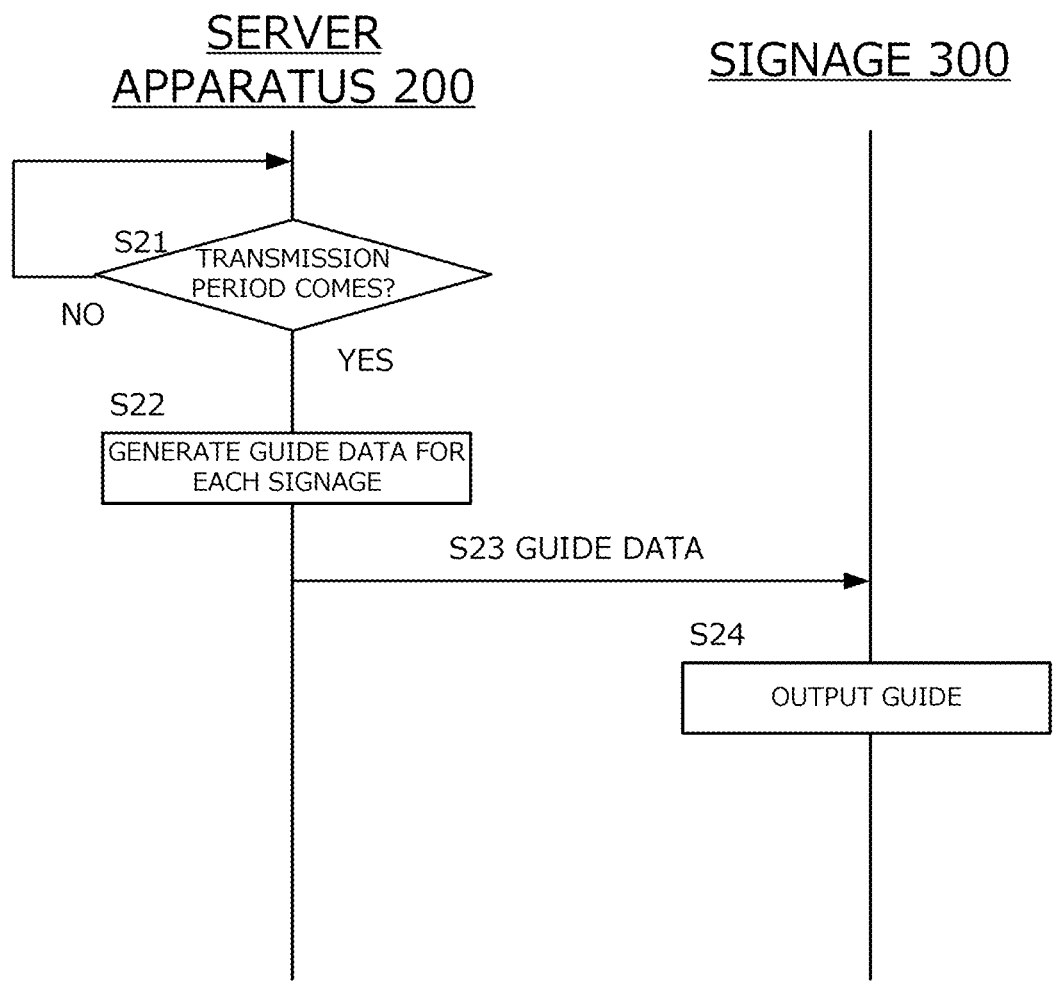
FIG. 15 is a sequence diagram of a process of transmission of the guide data by the server apparatus 200.

FIG. 15 is a sequence diagram of a process of transmission of the guide data to the signage 300 by the server apparatus 200. The illustrated process is repeated every predetermined period of time during operation of the route bus.

First, in step S21, the information providing unit 2011 determines whether a predetermined transmission period comes or not. In the case where a predetermined period (a period of one minute, for example) comes, the process proceeds to step S22. In the case where the predetermined period does not come, standby is performed for a predetermined time, and the process is repeated.

In step S22, the information providing unit 2011 generates the guide data for each signage 300.

Figure 16:
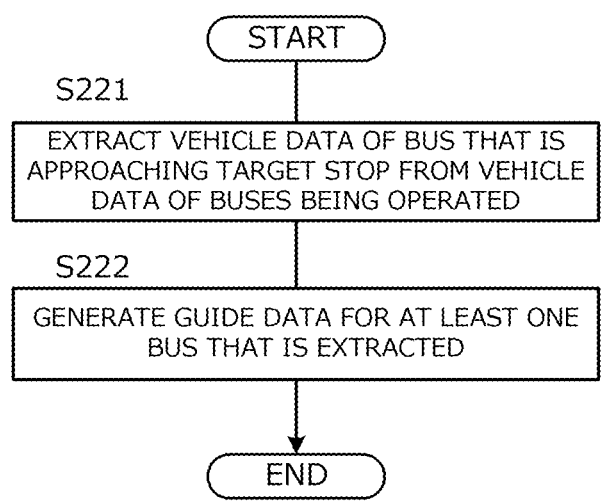
FIG. 16 is a flowchart describing a process that is performed in step S22.

FIG. 16 is a flowchart of a process that is performed by the information providing unit 2011 in step S22. The illustrated process is performed for each of a plurality of signages 300.

First, in step S221, the vehicle data of a bus that is approaching a target stop is extracted from pieces of vehicle data of buses that are being operated. Extraction may be performed based on the vehicle data 202A, the signage data 202B, and the route data 202C. More specifically, a route to which the target stop belongs is identified, and a bus that is within a predetermined distance from the target stop (for example, within three stops) or that is approaching a predetermined time (for example, three minutes) of the target stop is extracted from buses that are traveling along the route.

Next, in step S222, the guide data as illustrated in FIG. 6 is generated based on the vehicle data of at least one bus that is extracted.

The guide data that is generated is transmitted to a target signage 300 in step S23. In the case where there are a plurality of target signages 300, the information providing unit 2011 transmits the guide data to each of the target signages 300.

In step S24, the controller 301 (the guide unit 3011) of each signage 300 generates the image data based on the guide data that is received, and outputs the image data to the input/output unit 304.

In the present example, an example of outputting information about a bus that is traveling is described, but the signage 300 may also generate a screen for requesting operation itself of a bus and output the screen. The screen is a screen for specifying a desired boarding date/time and a desired alighting point, for example.

Figure 17:
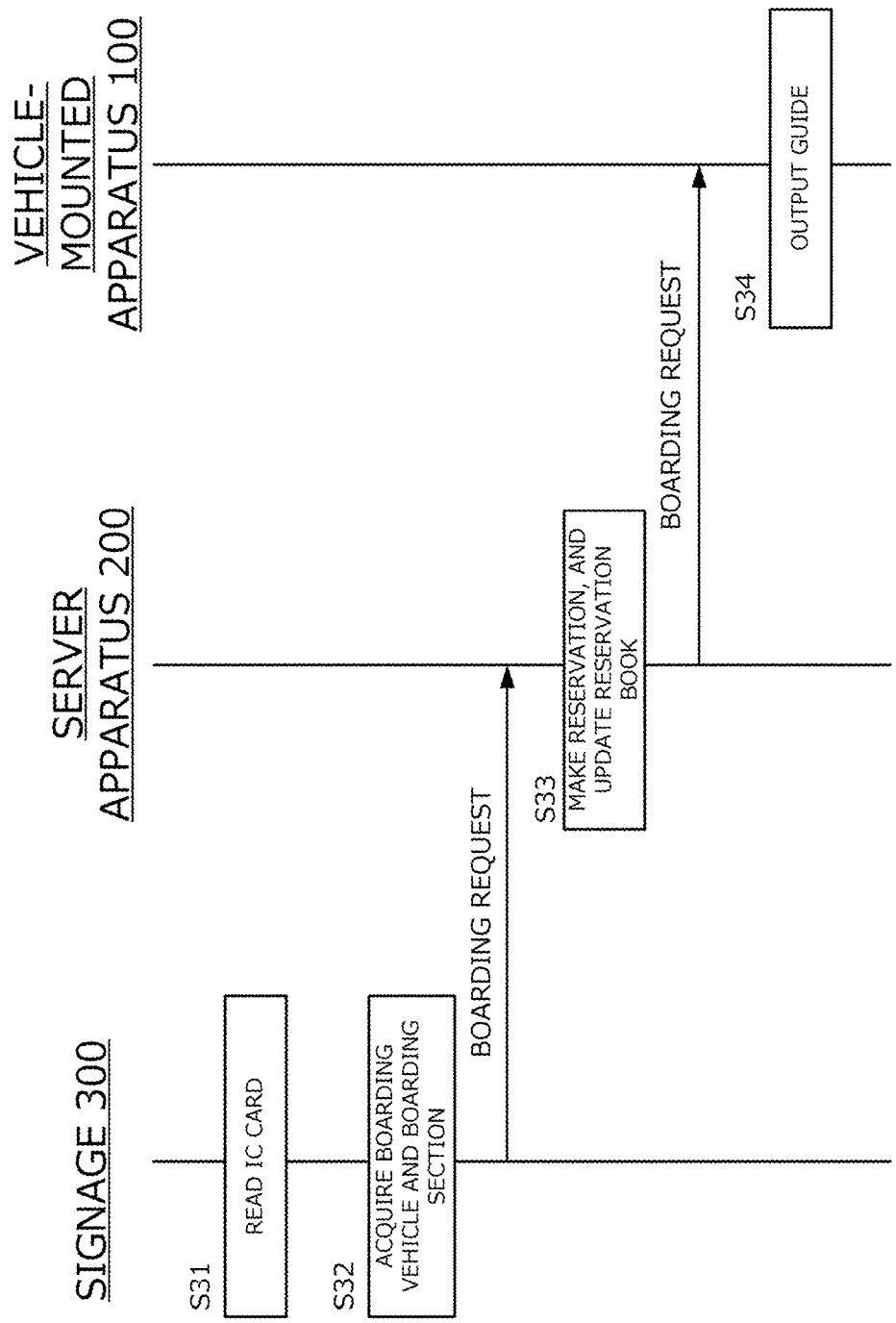
FIG. 17 is a sequence diagram of a process of making a boarding reservation for a bus.

Next, a process of a user making a reservation for boarding the vehicle 10 by using the signage 300 will be described. FIG. 17 is a sequence diagram of the process.

First, the signage 300 (the boarding request unit 3012) reads the IC card via the card reader 304C (step S31). The personal identifier and the service identifier are thus acquired by the signage 300.

Next, the boarding request unit 3012 acquires specification of the boarding vehicle and the boarding section via the touch panel 304B (step S32).

Then, the boarding request unit 3012 generates the boarding request including the IC card information, the boarding vehicle, and the boarding section, and transmits the boarding request to the server apparatus 200 (the reservation unit 2012).

The server apparatus 200 (the reservation unit 2012) makes a reservation for the vehicle 10 based on the boarding request (step S33). The reservation for the vehicle may be made by referring to the reservation book data, for example. When the reservation is fixed, the reservation unit 2012 newly adds a corresponding record in the boarding data 202E.

Furthermore, the reservation unit 2012 transmits the boarding request to the vehicle-mounted apparatus 100 mounted on the corresponding vehicle 10. The boarding request that is transmitted is received by the vehicle-mounted apparatus 100 (the reception unit 1012).

The reception unit 1012 notifies the driver or a crew member of the bus, via the output unit 105, of "the stop where the target passenger is to get on", based on the boarding request transmitted from the server apparatus 200 (step S34). The notification may be performed visually or by audio, for example. The driver or a crew member of the bus may thereby grasp that a passenger is getting on from a predetermined stop.

In the present example, an example where a boarding reservation is made for a bus that is already being operated is described, but a request for operation of a bus may also be made by specifying a future date or time, a boarding section and the like. In this case, the server apparatus 200 may transmit data instructing operation itself to the vehicle-mounted apparatus 100. The data may specify the operation route and the operation schedule. A result of the request may be presented to the user via the signage 300.

The server apparatus 200 performs a settlement process for a fee at a predetermined timing. The predetermined timing may be after the user gets off the bus, for example.

Settlement of a fee may be performed using the settlement information that is stored in the user data. For this purpose, the server apparatus 200 may receive, from the vehicle-mounted apparatus 100, data for determining alighting of the target user from the bus.

As described above, with the system according to the first embodiment, a boarding reservation for an on-demand bus may be made using the signage apparatus that is installed at a stop. Accordingly, a user is enabled to make a boarding reservation for an on-demand bus even when the user does not carry a mobile terminal or the like. Furthermore, with the system according to the first embodiment, the boarding reservation is made using an IC card that is used for other than the transport service by the on-demand bus. According to such a configuration, identification of an individual may be performed at a low cost.

First Modification of First Embodiment

In the first embodiment, a user inputs a boarding section and the like at the time of making a boarding request, but in the case where the transport service by a bus was used by the user in the past, the boarding section and the like may be suggested based on the boarding data.

Figure 18:
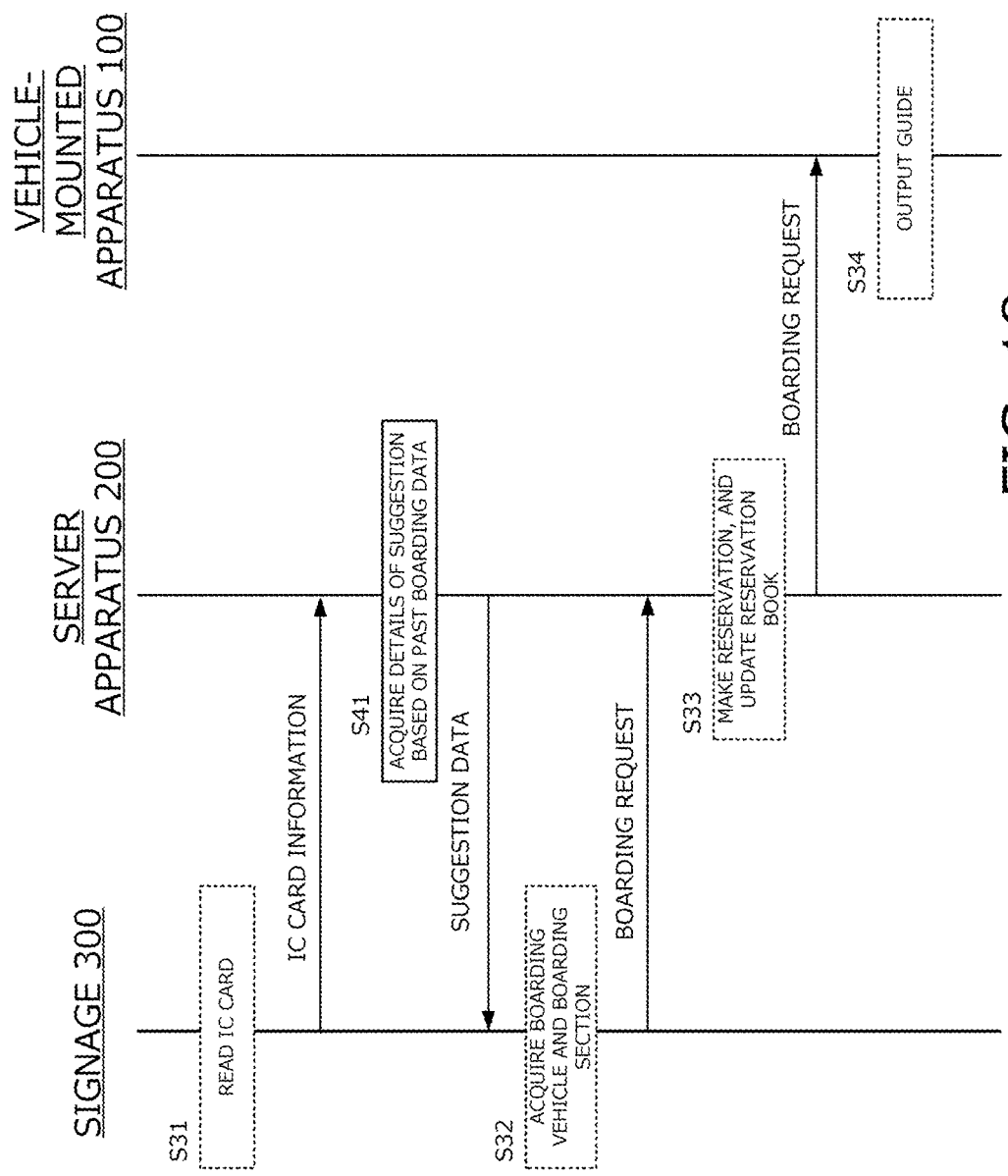
FIG. 18 is a sequence diagram of a process of making a boarding reservation for a bus according to a modification.

FIG. 18 is a sequence diagram of a reservation process according to the present modification.

In the present modification, after the IC card information is read by the signage 300, the IC card information is transmitted to the server apparatus 200.

Then, the server apparatus 200 identifies the user based on the IC card information, retrieves past boarding data of the user, and acquires information about the boarding vehicle or the boarding section (step S41).

In the case where there is a specific trend in the boarding vehicle or the boarding section, the server apparatus 200 generates data (suggestion data) for making a suggestion according to the trend, and transmits the data to the signage 300. The suggestion data may make a suggestion regarding the boarding section, the alighting point or the like, or may make a suggestion regarding a time slot for boarding, for example. The signage 300 provides details of the suggestion to the user using the screen illustrated in FIG. 13B, for example, and receives input.

Second Modification of First Embodiment

In the first embodiment, a boarding reservation is made based only on the IC card information. However, there is a case where a new reservation should be limited even when the IC card information is valid. Such a case may be a case where settlement of a fee is not completed for past boarding, or a case where the user did not get on the reserved bus with no proper reason, for example.

To cope with such a case, the boarding data may store data about boarding record or settlement record, and whether to accept a new reservation or not may be determined based on the data. For example, in the case where the user did not get on the bus although a boarding reservation was made, or settlement of the fee was not properly performed, a record to that effect may be made in the boarding data illustrated in FIG. 10 (for example, in the field "status").

Moreover, in the case where past boarding data of a user includes data indicating that boarding or settlement was not normally completed, the reservation unit 2012 may put restrictions on new reservation in step S33. In this case, corresponding IC card information or user data may be invalidated.

According to such a configuration, inappropriate use of the system may be prevented.

Modifications

The embodiment described above is merely an example, and the present disclosure may be changed for implementation as appropriate within the scope of the disclosure.

For example, processes and means described in the present disclosure may be freely combined for implementation to the extent that no technical conflict exists.

In the description of the embodiment, the user data is used to make a boarding reservation, but it is also possible to allow a boarding reservation to be made in a state where there is no valid user data (that is, a state where there is no user registration). In this case, a boarding reservation may be accepted on the condition that provisional user data corresponding to the IC card information is generated and user registration or registration of settlement information is performed within a predetermined period of time. In the case where registration is not performed within the predetermined period of time, the user data that is provisionally generated may be invalidated.

In the description of the embodiment, identification of a user is performed using the IC card information, but identification of a user may also be performed using different data as long as the data can be acquired by the signage 300. For example, information that is wirelessly transmitted by an RFID tag, an NFC tag or the like may be used. A result of reading a two-dimensional code or the like by a camera may also be used.

Processing described as being performed by one apparatus may be shared and executed by a plurality of apparatuses. Or alternatively, processing described as being performed by different apparatuses may be executed by one apparatus. In a computer system, what hardware configuration (server configuration) each function is realized by can be flexibly changed.

The present disclosure can be realized by supplying a computer program implemented with the functions described in the above embodiments to a computer, and one or more processors that the computer has reading out and executing the program. Such a computer program may be provided for the computer by a non-transitory computer-readable storage medium connectable to a system bus of the computer or may be provided for the computer via a network. As the non-transitory computer-readable storage medium, for example, a disk of a given type such as a magnetic disk (a Floppy® disk, a hard disk drive (HDD) and the like) and an optical disc (a CD-ROM, a DVD disc, a Blu-ray disc and the like), a read-only memory (ROM), a random-access memory (RAM), an EPROM, an EEPROM, a magnetic card, a flash memory, an optical card, and a medium of a given type that is appropriate for storing electronic commands are included.

What is claimed is:

1. An information processing apparatus comprising a controller configured to:
periodically transmit guide data to a signage apparatus,
(i) the signage apparatus being installed at a boarding/alighting point of an autonomous on-demand bus that is operated on demand and configured to read an IC card associated with a first user by means of near-field communication, the IC card being associated with a second service different from a transport service by the autonomous on-demand bus, and
(ii) the guide data causing the signage apparatus to display a first screen showing real-time bus location and arrival information and indicating acceptance of IC cards associated with the second service;
acquire first data for identifying a first user of the autonomous on-demand bus, the first data being
(i) acquired by the signage apparatus installed at a boarding/alighting point of the autonomous on-demand bus by reading the IC card associated with the first user, and (ii) for unique identification of users, including the first user, in relation to the second service;

in response to acquiring the first data, transmit boarding selection data to the signage apparatus, the boarding selection data causing the signage apparatus to display a second screen for the first user to input a selection;

receive second data based on the selection input by the first user to the second screen;

make a boarding reservation for the autonomous on-demand bus based on the first data and the second data; and transmit the boarding reservation to a vehicle-mounted apparatus of the autonomous on-demand bus, the boarding reservation causing the vehicle-mounted apparatus to display information about a stop where the first user is to board, wherein in response to receiving the boarding reservation, the autonomous on-demand bus is controlled to autonomously travel to the stop where the first user is to board.

2. The information processing apparatus according to claim 1, wherein
the first data further includes an identifier of the second service.

3. The information processing apparatus according to claim 1, further comprising
a storage configured to store user data for mapping the first data to user information about a user of a transport service by the autonomous on-demand bus.

4. The information processing apparatus according to claim 3, wherein
the controller converts the first data into the user information based on the user data.

5. The information processing apparatus according to claim 1, further comprising
a storage configured to store a history on the boarding reservation, wherein,
in a case where the first data is received from the signage apparatus, the controller infers a boarding section of the first user based on a past boarding reservation associated with the first user and transmits, to the signage apparatus, the boarding selection data for suggesting the inferred boarding section to the first user.

6. The information processing apparatus according to claim 1, further comprising
a storage configured to store user data for mapping the first data to settlement-related information.

7. The information processing apparatus according to claim 6, wherein
the settlement-related information at least includes fee payment record of the first user.

8. The information processing apparatus according to claim 7, wherein
the controller makes the boarding reservation in a case where there is no unsettled payment of fee in relation to the first user.

9. An information processing system comprising:
at least one signage apparatus that is installed at a boarding/alighting point of an autonomous on-demand bus that is operated on demand; and
an information processing apparatus, wherein
the at least one signage apparatus includes a first controller configured to:
acquire first data for identifying a first user of the autonomous on-demand bus, and
transmit the first data to the information processing apparatus, the first data being acquired by the at least one signage apparatus reading an IC card associated with the first user by means of near-field communication, the IC card being associated with a second service different from a transport service by the autonomous on-demand bus, and the information processing apparatus includes a second controller configured to:
periodically transmit guide data to the at least one signage apparatus, the guide data causing the at least one signage apparatus to display a first screen showing real-time bus location and arrival information and indicating acceptance of IC cards associated with the second service,
acquire the first data for identifying the first user of the autonomous on-demand bus, the first data being
(i) acquired by the at least one signage apparatus installed at a boarding/alighting point of the autonomous on-demand bus by reading the IC card associated with the first user, and
(ii) for unique identification of users, including the first user, in relation to the second service,
in response to acquiring the first data, transmit boarding selection data to the at least one signage apparatus, the boarding selection data causing the at least one signage apparatus to display a second screen for the first user to input a selection,
receive second data based on the selection input by the first user to the second screen,
make a boarding reservation for the autonomous on-demand bus based on the first data and the second data, and
transmit the boarding reservation to a vehicle-mounted apparatus of the autonomous on-demand bus, the boarding reservation causing the vehicle-mounted apparatus to display information about a stop where the first user is to board, wherein
in response to receiving the boarding reservation, the autonomous on-demand bus is controlled to autonomously travel to the stop where the first user is to board.

10. The information processing system according to claim 9, wherein
the first data further includes an identifier of the second service.

11. The information processing system according to claim 9, wherein
the information processing apparatus further includes a storage configured to store user data for mapping the first data to user information about a user of a transport service by the autonomous on-demand bus.

12. The information processing system according to claim 11, wherein
the second controller converts the first data into the user information based on the user data.

13. The information processing system according to claim 9, wherein
the information processing apparatus further includes a storage configured to store a history on the boarding reservation, and
in a case where the first data is received from the signage apparatus, the second controller infers a boarding section of the first user based on a past boarding reservation associated with the first user and transmits, to the signage apparatus, the boarding selection data for suggesting the inferred boarding section to the first user.

* * * * *